United States Patent Office

3,175,596
Patented Mar. 30, 1965

3,175,596
APPARATUS FOR TREATMENT OF DEHYDRATED PUREES
George Wesley Raye, Noroton, Conn., assignor to General Foods Corporation, White Plains, N.Y., a corporation of Delaware
Filed May 18, 1960, Ser. No. 29,926
8 Claims. (Cl. 146—79)

This invention relates to a novel apparatus for producing dehydrated pureed food products which may for example be suitable for feeding infants and adults requiring geriatric or postoperative care; and which may be generally useful in the preparation of soups, desserts, and other food preparations. More particularly, the invention relates to an apparatus which permits the manufacture of dehydrated strained food products which may have a relatively high percentage of natural or added sugars and/or pectinous substances; which may be readily rehydratable in cold tap water, milk or other aqueous liquids; and which, when frozen in a relatively dehydrated condition, may be free from agglomeration whereby a free-flowing readily handled product is obtained. It is a particular feature of the apparatus of this invention that it permits attainment of a free-flowing product which has an extended storage life.

In the art of preparing so-called dehydro-frozen fruits such as pears, peaches, apples, apricots, tomatoes, cranberries, and the like in the form of purees, it is desirable that the product have the ability to rehydrate "instantly" and completely; in this connection the term "instantly" is used to describe a product capable of rehydrating in a few seconds to one minute, typically about 30 seconds, which hydration can take place in cold, lukewarm, warm, or boiling water or other aqueous liquid and is accompanied by a rapid increase in viscosity.

Heretofore, in recognition of the economies offered in terms of reduced package weight and volume, proposals have been made for processes to reduce the moisture content of fruits by dehydo-freezing them. Most dehydro-freezing practices involve a relatively slow drying operation, during which operation, certain factors are operative to impair the desired rehydration characteristics of the product. Typical of such slow dehydration procedures are processes employing so-called tunnel or truck dehydrators which have been used for many years to dehydrate vegetables and fruits. For the drying of fruit purees, more rapid and economical drying may be effected by passing a slurry of puree onto a revolving drum, the outer surface of which is heated and which offers a drying interface having good heat transfer and film release properties capable of increasing the solids content of the puree from say 9–40% up to as high as 98–90% solids but preferably not above that solids level where flavor, color and nutrition suffer.

In carrying out such a drum drying operation, a number of difficulties are encountered which tend to impair the rehydration characteristics of the dried product. The partially dehydrated film of product is plastic at the point of removal from the drum and when removal is effected by a doctor blade tangentially engaging the smooth surface of the drum, there may be a build-up of product on the doctor blades such that as the product is removed from the drum, it assumes a wavy irregular surface of somewhat crepe-like appearance due to the deceleration of the film as it leaves the dryer. Build-up of this thickness of product is adverse to rapid rehydration of the doctored product.

Heretofore prior art drum drying practices have been concerned with the problems involved in protecting the product doctored from a drum dryer against overheating. Thus, in conventional prior art techniques it has been suggested that a blast of cold air be directed at the doctoring or scraping point or that the continuous film of product doctored from the drying surface be rapidly removed from the vicinity of the drying surface. However, such prior art practices fail to endow the continuous film thus dehydrated with any substantial rehydration or reconstitution properties. Such prior art is only concerned with maintaining a substantially continuous unbroken web or film consistent with good uninterrupted manufacturing practice such that a minimum of downtime will arise from film breakage.

It has long been appreciated that the various techniques and prior art pieces of apparatus which have been employed are deficient in that they fail to permit attainment of a free-flowing product which is readily rehydratable. Various modifications of the apparatus have been made, and much thought has been given to the design of apparatus by those skilled-in-the-art, but no apparatus has heretofore been devised which permits attainment of the desired product possessing the superior characteristics hereinbefore noted.

It is an object of this invention to provide an apparatus whcih permits attainment of a dried puree characterized by unexpectedly superior rehydration characteristics, by its free-flowing nature, and freedom from agglomeration on storage. Other objects will be apparent to those skilled-in-the-art on inspection of the following description and drawings.

In accordance with certain of its aspects, the apparatus of this invention for producing a flaked puree from a dried stretched film of puree comprises a substantially horizontal conduit having a material inlet and a material outlet, means within said conduit to convey said material from the inlet end of said conduit to the outlet end thereof, inlet means for admitting conditioned gas to one end of said conduit, said gas in passing through said conduit contacting said material flowing therein, and means for collecting said material at the outlet end of said conduit.

In practice of the invention according to its more specific aspects, the apparatus may comprise a substantially horizontal, but preferably upwardly inclined conduit having a material inlet and a material outlet, means within the conduit for conveying and preferably agitating the material as it is conveyed from the inlet end of the conduit to the outlet end thereof, this conveying means preferably being a rotatable screw mounted within the conduit and occupying less than the complete cross-sectional area thereof, means for admitting conditioned, preferably cooled i.e. refrigerated and preferably dry, air to one end of the conduit, means for withdrawing said air from the other end of the conduit, and means for collecting the material at the outlet end of the conduit.

The novel apparatus of this invention is particularly adapted to function in connection with a drying system from which a continuous film of dried material may be obtained. This may preferably include a drum dryer wherein the drying surface is the surface of a right-cylindrical drum which is adapted to rotate about its axis which lies in a horizontal plane. Although a single drum dryer or a twin drum dryer may be employed, it is preferred to use a double drum dryer wherein the drums rotate toward each other at the top.

The rotating drums will be preferably heated as by provision therein of appropriate coils or conduits for passage of appropriately heated air, steam, or hot water, and preferably the apparatus will be designed to permit heating by steam or hot water.

The feed to the apparatus of material to be dried will be in liquid phase, commonly as a slurry, and it may be delivered to the outside of a heated drum by positioning a drum so that a portion thereof is immersed in a pool of the liquid or by passing the liquid over the appropriate spreading devices onto a drum. Preferably, however, when the rotating double drum dryer is employed, the liquid may be fed by means of an appropriate conduit to a pool of liquid maintained between the drums, the drums being positioned sufficiently close together to maintain the pool. As the drums rotate, a portion of the liquid passes through the pinch between the drums and forms on the drums a thin film of the order of 0.010 in. thickness. This film is carried around on the drying surface of the drum during which time it is dried by the heat originating inside the drum. Typically the moisture content may be lowered from the charge moisture of about 60%–91%, say to a dry moisture content of about 2%–10%.

The so-dried stretchable film may be removed from the rotating drum dryer by appropriate peeling or scraping means. Commonly a doctor blade which may for example be positioned with its cutting edge approximately tangential to the surface of the drum, may be employed to remove the stretchable film from the drum dryer as a continuous film.

The continuous, partially dried, stretchable film is preferably conducted away from the point of removal from the drum by means for subjecting the removed continuous film to a tension which is (a) substantially in excess of that required to prevent agglomeration during removal, (b) sufficiently great to stretch the film, and (c) less than the failing tension of the film, and (d) sufficiently great to impart a random distribution of discontinuous surface failures and void spaces throughout the film. During this removal, the film will be stretched or elongated.

Preferably this stretching is effected by a stretch roll which in the preferred embodiment may be a cylinder adapted to rotate along an axis parallel to the axis of rotation of the drum dryer, and to rotate in the direction of travel of the partially dried stretchable film which is drawn off the dryer.

The circumferential speed of the stretch roll is sufficient to provide the hereinbefore noted tension in the film. Although it may be possible to mechanically interlink the stretching roll with the rotating drum dryer and even to permit the two to rotate at the same r.p.m., it is preferred to drive the stretch roll independently. The stretch roll may be larger or (preferably) smaller than the drum dryer, but in any case it will rotate at an appropriate speed to insure that its circumferential velocity is sufficiently great to impart to the film the degree of stretch herein noted.

The stretch roll will preferably possess a frictional or roughened surface which creates friction when the stretchable film passes thereover. The roughened surface may be foraminous i.e., it may be a more-or-less flat surface containing a plurality of perforations; preferably, however, it may be reticular and in the preferred embodiment, the surface of the stretch roll may include sections of expanded metal lath or chicken wire which may, if desired, be supported on a foraminous metal surface.

The take-away or stretch roll may be suitably equipped to apply suction to the contacting face of the sheet passing thereover thus insuring a positive travel of product in accordance with the peripheral speed of the roll or reel and incidentally withdrawing both heat and moisture; such a modification may comprise a roll having a plurality of perforations communicating with a vacuum so as to provide means whereby suction is applied at the periphery of the roll only at the arc of contact required to effect the desired tension.

It is a particular feature of this apparatus that it includes a rider wheel or tension wheel which insures sheet speed is equal to the peripheral speed of the stretch roll, such action being insured by positive contact against the stretch roll as provided by riding wheels of such size, number, and placement to provide a gentle gripping contact. While such riding rolls may be idler wheels, other means will doubtless occur to those skilled in the art.

The riding, tension, or idler wheel may be variously constructed depending upon the particular material being treated. It will preferably be a series of spaced shorter rolls; it may be more-or-less rigidly mounted or it may be mounted in a spring-loaded bearing to thereby resiliently ride on the stretch roll.

The stretched film of material which has passed between the rider wheel and the stretch roll may contain an inherently instantly rehydratable dried puree which must be comminuted or reduced to desired size and condition for packaging and storage.

According to certain of its aspects, the novel apparatus of this invention, which may be employed to treat such a dried stretched film may include a substantially vertically extending hopper through which the downwardly descending film may pass. Preferably the hopper is substantially completely enclosed to contain therein a condition i.e. preferably cooled dried gas which contacts the entering film of material. The hopper may bear, preferably at an upper portion thereof, an outlet conduit through which exiting circulating gas, e.g. air may leave, and this may join the hopper body proper through a foraminous wall portion of the hopper. Provision of an appropriate exit for slightly pressurized air may be provided adjacent to the inlet port at the upper portion of the hopper whereby air may preferably exit through the exit rather than through the material inlet port.

The air exit for circulating gas may alternatively be from the conduit hereinafter described, at a point thereon adjacent to the hopper.

In one embodiment, the foraminous portion of the hopper wall may be separated from the main portion of the hopper by a reticular wall which may serve as a barrier to the falling film of material, to prevent it from being drawn into the foraminous portion of the wall and thereby plugging the holes therein.

The hopper may include a sheet breaker at a point therein sufficiently far removed from the entrance of the film so that the film may be cooled before contact with the sheet-breaker. The sheet-breaker may include a horizontal rotatable breaker axis bearing a plurality of axially spaced breaker pins, arms, or fingers (each arm may for example be a circular disc mounted perpendicularly to the breaker axis) and a coacting plurality of guide wires adapted to maintain the descending sheet in contact with the breaker arms thereby to facilitate breaking the sheet. Preferably the guide wire assembly includes a horizontal axis or shaft and a plurality of axially spaced guide wires, each extending away from said shaft, preferably vertically downwardly and each terminating between an adjacent pair of breaker arms (or discs) at a point closer to the breaker axis than the point on said breaker arms furthest removed from said breaker axis. In operation, the peripheral speed of the sheet breaking pins will be greater than the linear speed of the film to insure tearing of the film.

The lower portion of the hopper may join with and be integrally connected with a trough which will preferably be an integral portion of a conduit or tube containing a means for conveying material from the inlet end of the conduit to the outlet end thereof. The conveying means may include a pneumatic means, belt means, or vibrating means typified by a vibrating screen. In the preferred embodiment, the conduit and trough will contain a preferably more-or-less horizontal rotating screw in the lower portion thereof. The screw may further break up the falling film and convey it, as hereinafter discussed in detail. The screw rotates in manner to carry material from the inlet-trough end of the conduit to the outlet end thereof. Preferably the conduit will be insulated and substantially totally enclosed. The screw will preferably occupy a substantial portion of the cross-sectional area of the conduit, but the upper portion of the conduit may be unobstructed by the screw to permit passage therethrough of gas, as hereinafter described in detail.

The screw, which is of smaller diameter than the inner diameter of the conduit and which preferably has its axis of rotation below the axis of the conduit, may bear flights to facilitate agitation of broken flakes being conveyed by the screw from the inlet end of the conduit to the outlet end thereof. The screw may be of closed or open construction (i.e. it may be a solid screw or a plurality of helically positioned ribbons arranged in screw-like manner), all to the end that the conveying-agitating action be sufficient to permit the conveyed material to be thoroughly contacted with gas as it is conveyed and broken up.

The conduit and enclosed conveyor (e.g. screw) may be mounted so that its axis is substantially horizontal. As used in this specification, the term horizontal includes a conduit which is truly horizontal as well as one which is inclined at an angle of typically 10° or 20° but which is related to the dynamic angle of repose of the particles being conveyed so that these particles may be positively passed along through the conduit under the influence of the conveyor toward and to the outlet of the conduit.

The outlet end portion of the enclosed conduit bears, preferably on an upper portion thereof an air inlet conduit. If desired, the air flow may be co-current rather than counter-current and thus the relative position of air inlet and air outlet may be reversed. Immediately adjacent to the material outlet end of the conduit is a flaker-breaker wherein the cooled flaked material leaving the conduit may be further reduced to desired size. In the preferred embodiment, the flaker-breaker may comprise a horizontally mounted rotatable axis bearing a plurality of preferably radially and axially outwardly extending rigid vanes, at least some of which may bear resilient portions at the outer extremity thereof.

The flaker-breaker may also include a preferably foraminous or reticular surface which is preferably cylindrical in shape adapted to receive and hold the conveyed material and having its central imaginary axis preferably substantially coincident with the rotatable axis hereinbefore referred to. The surface is spaced with respect to the vanes so that at least some of them closely approach the surface and thereby gently force the material therethrough while controllably particulating it. A hopper-collector beneath the flaker-breaker may collect the so-flaked material.

In the preferred embodiment, the apparatus includes a circuit for cooling and preferably drying the gas, preferably air, which may circulate through the screw-containing conduit. The air outlet conduit preferably connects to a snow and dust separator, preferably of the cyclone type, wherein any entrained moisture may be separated from the air, and this in turn may be connected to a dryer, typically one containing adsorbent material such as silica gel, whereby the moisture content of the air may be lowered.

Preferably the cooling system includes a refrigeration means immediately following the dryer which means may be sufficient to cool the circulating gases to e.g. as low as minus 15° F. Preferably, however, it may include a first refrigeration unit for cooling the gas to slightly below about 32° F. to remove remaining traces of water, and a second refrigeration unit for cooling the gas further. Preferably the system includes a reheater to raise the temperature of the dehumidified air to desired temperature. Appropriate fan or blower means may be provided as well as desired by-pass means and also desired ductwork or conduitry to permit passing the reheated gas to the air inlet conduit of the screw-conduit.

The apparatus of this invention may be employed in the art of drying purees, puddings, and similar products having a relatively high proportion of natural or added sugars and/or pectinous substances initially present, added or liberated in cooking. This novel apparatus permits attainment of an instantly rehydratable product in film or flaked form. For ease of reference the materials to be processed by the apparatus of this invention will be referred to hereinafter as "purees," but will be understood to encompass soup stocks, slurries, and solutions containing solid particles, all of which compositions tend to form continuous stretchable films rather than a powder upon removal in a concentrated form from a drying surface. The apparatus of this invention may be employed in a process which comprises applying a puree having a solids content usually of the order of 9%-40% (but sometimes higher) to a smooth surface wherein the puree is heated, partially dehydrated, and converted into a film having a syrupy viscous elastic condition while in the heated state; in this condition, finely divided food solids are suspended in a molten liquefied sugar and/or pectin-like carrier which supplies to the film a certain minimum tensile strength varying from product-to-product, but sufficient to permit the product to retain a continuous cohesive nature. Films of apple, and to a lesser degree peach purees, will have a much greater tensile strength than pudding films due to the higher preponderance of pectinous material in fruits.

This film is continuously stripped under tension from the aforesaid heating surface, which stripping is preferably effected by such means as a doctor blade. In general the moisture content of the film removed by means of a doctor blade or other suitable means will be less than 10% and higher than 2% by weight of the film. This film is continuously stripped under tension with care being exercised to avoid agglomeration at the point of film removal, a tendency likely to occur at the doctor blade.

Upon stripping, the film is subjected to tension substantially in excess of that required to prevent agglomeration at the doctor blade and below that tension at which the film will fail as evidenced by complete breaking or fracture resulting in interruption of the continuity of the film; the tension should be sufficient to thinly and discretely disperse food solids in the still molten carrier therefor to produce a film of optimal thinness. In general, this condition will be evidenced by a random distribution of openings, surface failures and void spaces throughout the film and will also be manifest in most products by minute blistering or puffing barely visible to the unaided eye, giving rise to a plurality of postules some of which are broken and some of which are substantially intact.

Under a microscope the stretched cooled product can be seen to comprise a translucent base layer or phase holding dispersed solids with a majority of the surface of the film being comprised of translucent areas of microcrystalline sugars. It is characteristic that the stretching tension which is applied be sufficiently great to increase the ratio of the surface area of the stripping film to its weight to a point substantially above that prevailing in the case of an unstretched film but also above that point at which substantial discontinuous film-surface rupture occurs.

Hence the tension employed for removal of the film from the heating surface is well in excess of that normally required to prevent agglomeration of the product and rapid removal of the film from the drying surface. Not only is stretching of the stripped film carried out under conditions sufficient to induce discontinuous small ruptures indicating a loss of elasticity at spaced points, but also whereat gas or vapors generated in the heated drying zone are effective to cause a blistering or puffing of the continuous translucent phase. Such an expansion will contribute to the evaporative cooling of the thin film of material.

Stretching may be carried out by a positive controllable means. Because of the desired film characteristic such stretching means must be capable of creating such a rate increase uniformly without inducing excessive tension while assuring the creation of sufficient tension to establish and maintain a high degree of dispersion of food solids throughout molten carrier therefor.

By virtue of the condition of the flake created by stretching, there is an ideal distribution of the water soluble and water insoluble food solids within the flake with the flake displaying attractive colors and offering fresh flavors. The water soluble food solids comprise a continuous phase which is substantially crystalline, with water insoluble solids being thinly and discretely dispersed therein as a discontinuous phase. It is a distinct feature of the product of the present invention that a substantial majority of the surface of this thin cooled flake is comprised of said continuous phase in a microcrystalline state, said majority being established by the subcooling effect incident to the novel stretching action which is also accompanied by minute crater-like ruptures. By virtue of this arrangement and condition of water soluble and water insoluble food solids, the water soluble solids will go into solution quickly in cold water but not at the expense of the water insoluble solids which are ideally dispersed and have the greatest opportunity to rehydrate.

The importance of the foregoing stretching will be appreciated when it is considered that in the case of a plastic and yet stretchable film which is not stretched to the degree and in the manner contemplated herein and from which sensible heat is allowed to dissipate, a puree will have relatively poor rehydration characteristics, viz., 3-10 minutes is required when the product is reconstituted in cold or lukewarm water (40-80° F.). In the case of the aforesaid stretched film and the flake product, the product has rehydration characteristics which may be termed "instantaneous" and broadly speaking has the ability to reconstitute in cold to lukewarm water (40-80° F.) in less than 60 seconds depending upon the product, usually 1-30 seconds. Apple purees are the fastest in rehydration, this phenomenal rehydration being manifest in the form of a "blossoming" of the product upon reconstitution in water. In the case of pears a slight delay in the order of say 5 seconds is observed before such blossoming occurs. In any event, the foregoing rehydration characteristics prevail in a wide variety of fruits, and the term "fruit" as it is employed in the accompanying claims is intended to cover any plant having a high natural sugar content, say in the order of 13% by weight of solids, and represented by such common fruits as apples, cranberries, peaches, pears, apricots and the like.

The term "stretchable" as it is employed in the foregoing statement and in the accompanying claims is intended to describe that plastic condition which prevails when the puree has been reduced to a moisture content generally in the neighborhood of more than 90% solids and ranging anywhere between 90-98% solids, the upper range of moisture content being limited by the characteristics of the plastic state as well as the characteristics of the product itself which at an unduly high solids content can be deteriorated by excessive heat treatment; in general, it has been observed that moisture contents between 2-10% in the stretchable mass are desirable but still higher moisture contents in the order of 15% can also be practiced while carrying out the present invention; for natural fruit purees not having additives therein a moisture content in excess of 10% will be characterized as soupy; however modifying thickening agents such as starches, gums, dextrins, and the like, detailed hereinafter and capable of increasing the tensile strength of the puree, will of course alter the moisture content at which this desired stretchability will be found to prevail. In the preferred embodiment, the degree of stretching which should be practiced is that sufficient to stretch the product to the extent that a plurality of minute surface ruptures appear on the film surface.

Stretching is achieved preferably by causing the hydrous film of product to travel in a substantially uncompressed fashion over take-up means operating to cause the film of material to travel at a rate of speed commensurate with the total volume or weight of material being removed by the knife.

Although the film which has been dried and stretched as indicated possesses many of the desirable characteristics hereinbefore noted, it must be flaked or broken up into smaller particle sizes to permit proper handling and packaging. Preferably, it is desired that the flakes produced from the film be broken into smaller sizes depending upon the rehydration characteristics of the particular puree being dried. For most fruit purees and puddings, the film should preferably be flaked to a particle size such that 100% of the product passes through 10 mesh U.S. Standard screen (0.027" wire), although even larger size flakes may be produced with acceptable rehydration properties. In general, the film without further treatment according to this process, may not be broken up to a very fine particle size, vis., below a 40 mesh sieve.

Attainment of the improved products hereinbefore noted by use of the apparatus of the invention may preferably be effected by passing the dry stretched film into a chill flaker wherein the sheet may be cooled from its charge temperature of e.g. 100° F. or higher down to a temperature preferably below about 70° F. At temperature below about 70° F., the sheet is firm and rigid and it may readily be broken into smaller pieces constituting course flakes.

The material, which has been so reduced in size by a sheet-breaking operation, will preferably be further cooled to a temperature preferably below about 40° F., typically well below 32° F. and commonly to about 10° F. Preferably simultaneous with this further cooling will be a dehumidification and preferably both will be effected by passage of cooled dried air in countercurrent contact with the broken sheet particles. As the material is cooled and dehumidified, it will be preferably further broken up or reduced to finer flake size.

In the preferred embodiment, this may be effected by continuously agitating the flakes in the presence of a cool preferably dehydrated gas, as they pass through a chill-flaking operation. The so-chill-flaked material or portion thereof which may still be coarser than the desired flake size may then be conveniently further particulated to desired smaller particle size by gently expressing through a foraminous surface.

It is a feature of the material leaving this apparatus that it is characterized by its freedom from agglomeration and caking and by its free-flowing nature, particularly after an extended period of storage.

The product can be stored in a suitable refrigerated atmosphere or packed directly either in an inert gaseous atmosphere or under normal atmospheric pack. Thus, the product may be packaged in sterile air-tight containers such as tin cans in an inert gaseous atmosphere, e.g., nitrogen. However a far less expensive packaging system which is ideally and peculiarly suited to the stretched flaked purees of the present invention is the packaging and sale of those products in a frozen condition (10° F.) in any conventional frozen food packages.

Products acceptable as junior foods or soups may also be produced in accordance with the present invention. Thus concentrated soups of tomato, asparagus, pea and the like may be produced from the cooked pureed vegetable. Many of these vegetables will not have an inherent elastic nature such that they would not ordinarily have the stretchable character herein described. However, many of these materials do contain natural pectinous or pectin-like materials, e.g., cooked tomato paste, which are sufficiently elastic in a concentrated pureed form to be stretched as a film into products having the foregoing characteristics; for those materials which do not possess sufficient inherent elasticity, modifiers may be added to the puree prior to its concentration to a viscous state, such that films thereof may be stretched.

Typical of other materials which may be similarly processed are those containing a substantial proportion of fat associated either with meat or dairy products such as milk or butter. In such cases mixtures of starch, vegetables, fruits, and/or meat solids with such fatty constituents will offer a tacky, elastic quality to a concentrate doctored from a suitable drying surface and the concentrate can be elongated to a film of reduced thickness and will cool rapidly. The product resulting from such stretching, for example, a puree composed of carrots, bacon, celery, and rice flour will be found to be stretchable under the conditions herein specified and will be found to be instantly reconstitutable.

The puree which may be treated by the apparatus of this invention may be compounded from comminuted fruit solids and fruit juices, and mixtures thereof which it is possible to combine with vegetable solids and juices, meat solids, and comminuted vegetable-meat mixtures if desired, most of which in a concentrated condition lend themselves to the stretching technique of the process of the instant apparatus.

The puree may also be composed of other comestibles such as puddings high in starch and sugar levels and possessing a tacky, stretchable, viscous nature; in this latter category of materials various flavored puddings, such as vanilla, chocolate, orange and the like will be most suitable, the starch of such compositions being potato, tapioca, arrowroot, sago, corn, etc., either gelatinized or partially gelatinized. Overall, a substantial fraction of the non-aqueous constituents of the pudding puree will be starchy in nature or origin and will have been gelatinized to a gel-like consistency by reason of the heat treatment the puree undergoes as its solids content is increased on the drum to render the puree film-forming and stretchable.

Typical of these usable thickening materials which are starchy in nature, but not in origin as the term is commonly understood, are polysaccharides and cellulosic ethers, such as pectin, algin, Irish moss extract, gum arabic, gum acacia, alkali metal salts of carboxymethyl cellulose (CMC) and other non-ionic ethers of cellulose, the ionic ethers of cellulose, such as ethyl cellulose, methyl cellulose, methyl ethyl cellulose, hydroxy propyl methyl cellulose, and hydroxy ethyl cellulose. The present process contemplates that puree compositions can also be obtained by blending one or more of the foregoing gelatinous polysaccharides with proteinaceous materials of animal or vegetable origin, preferably isolated in a gellable heat denaturable condition; e.g., alkali or ethanol extracted soy protein, peanut protein, fish protein, and the like.

The greatest utility for the apparatus of the present invention is in producing such materials intended for infant and geriatric feeding where the facility of use and the desirable appearance and flavor as well as the likeness to fresh fruit are pleasing to the palate. Included in the term "fruit" are tomatoes, pears, apples, apricots, peaches, prunes, cranberries and similar fruity materials; mixtures of such fruits will also be found useful and pleasing in taste, e.g., apple-apricot, pear-apple, etc.

One specific embodiment of the apparatus of this invention is disclosed in the drawings (in which the apparatus is shown together with other apparatus for preparing the desired product) wherein.

Figure 1:
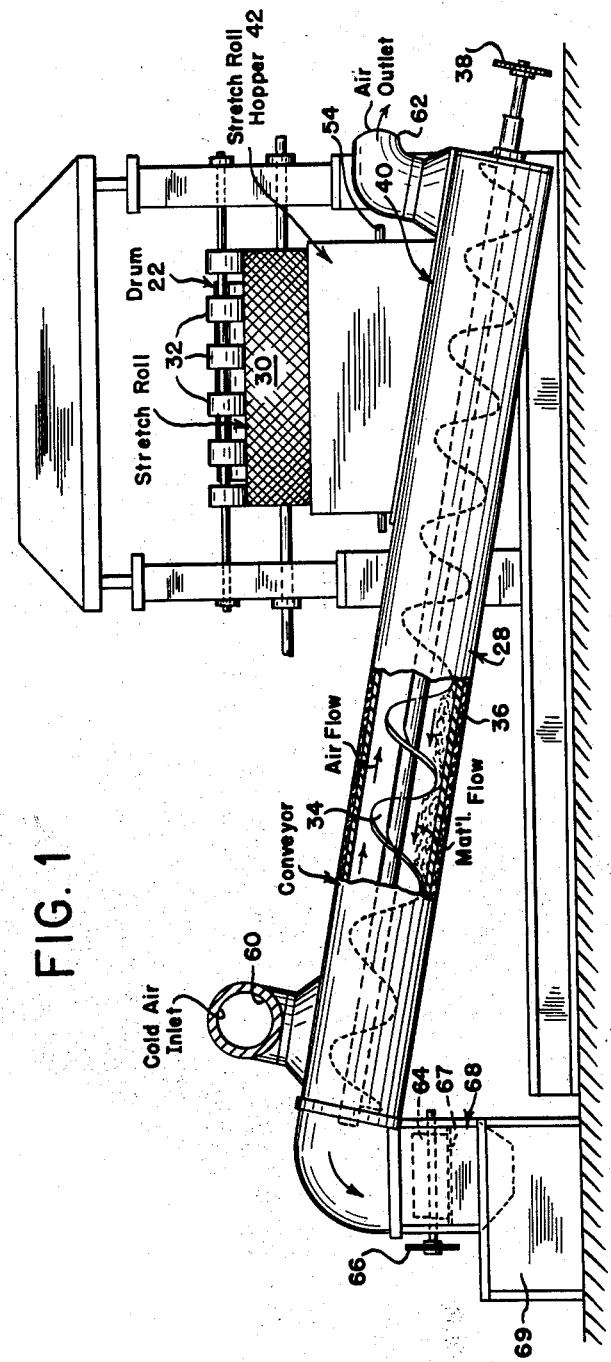
FIGURE 1 is a schematic side elevation with parts in section of an apparatus fabricated in accordance with this invention.

In a preferred embodiment of this invention, the apparatus comprises a double drum dryer having two cylindrical drums 20 and 22, each adapted to rotate about its horizontal axis. The drums 20 and 22 are closely positioned; the distance between the most closely approaching portions of the surfaces may be varied, but it may commonly be maintained at about 0.006–0.0150 inch. The drums 20 and 22 in this embodiment were chrome-coated drums 24 inches in diameter and each had an effective heating or drying surface of 25 square feet.

Each drum 20 and 22 was fitted with internal heat exchange conduits (not shown) to permit passage of heating medium, typically steam, therethrough and to thereby heat the peripheral surface thereof. Each drum was also provided with drive means to permit the drum to rotate about its horizontal axis at a rate which could be varied but which could conveniently be maintained in the range of 0.1 to 10.0 r.p.m., more typically 0.75–9 r.p.m.

Each drum was preferably provided with a means for removing the film therefrom as a continuous sheet, and this preferably was a doctor blade, generally designated 24. The blade 24 may be positioned so that its cutting edge is substantially tangential to the peripheral surface of the drum 22 (and a second blade will be similarly positioned on drum 20). Each doctor blade will also preferably be so positioned that the film which it removes may have been on the drum for a time sufficient to dry the film to a stretchable condition; typically this may mean that the film may be on the drum for e.g. 225° of revolution of the drum.

Figure 3:
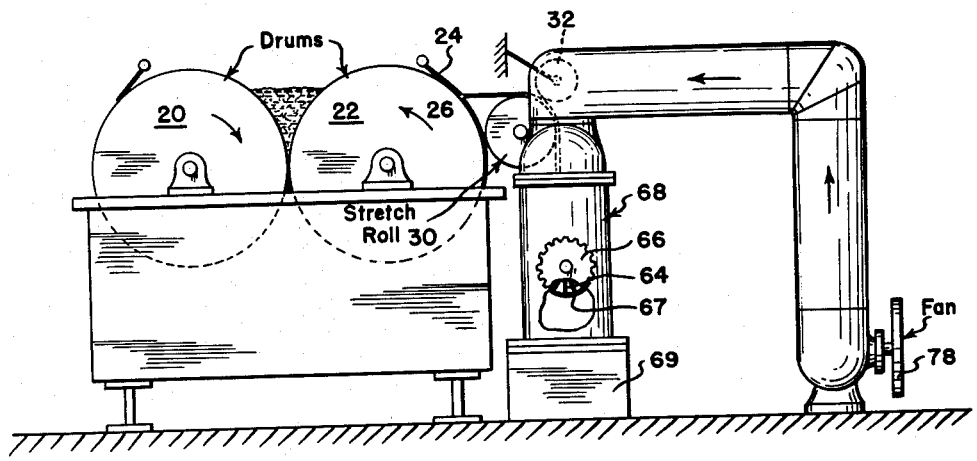
FIGURE 3 is a schematic end elevation of an apparatus similar to that of FIGURE 1 with certain parts modified.
Figure 4:
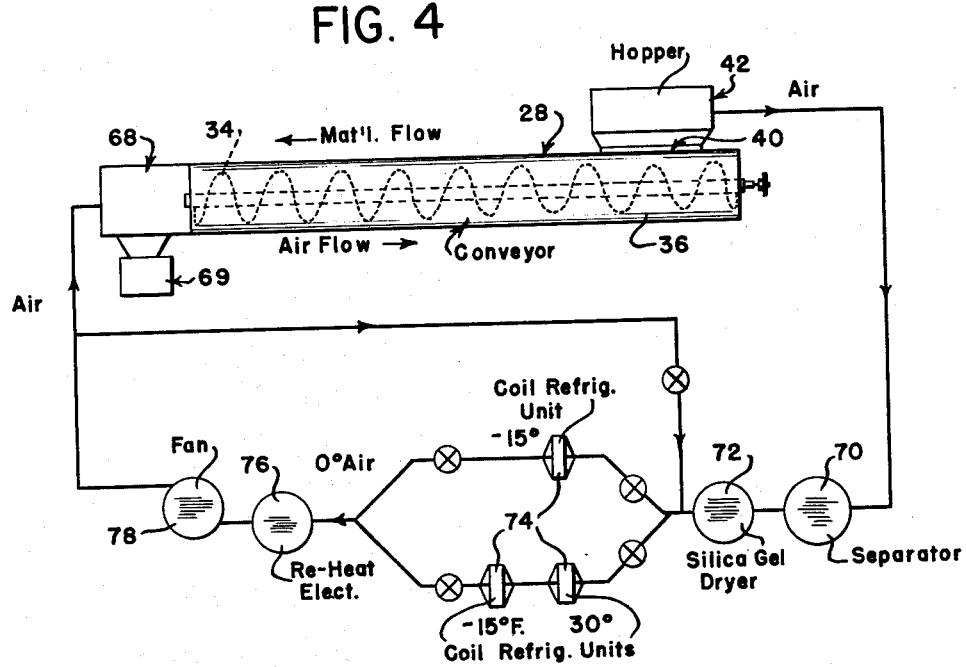
FIGURE 4 is a schematic view of the chilling and flaking apparatus of this invention.

The apparatus includes stretch roll 30 which in this embodiment was a six-inch diameter cylindrical drum adapted to rotate about its horizontal axis in a direction which is the same as the direction of travel of the film leaving drum 22 i.e. in the drawing as shown in FIGURE 3, the roll 30 will rotate clockwise. The axis of rotation of stretch roll 30 is parallel to the axis of rotation of drum 22.

In this embodiment, the cylindrical surface of the stretch roll includes a reticular wrapping of mesh made from expanded metal (or chicken wire) which provides a rough, friction creating surface on which the film or stretchable material may rest as it passes thereover.

The stretch roll may be provided with appropriate driving means to permit it to rotate sufficiently fast and to have a circumferential velocity sufficiently high to subject the continuous film removed from drum 22 to a tension which is (a) substantially in excess of that required to prevent agglomeration of the film during removal from the drum 22, (b) sufficiently great to effect stretching of the film, (c) less than the failing tension of the film, and (d) sufficiently great to impart a random distribution of discontinuous surface failures and void spaces throughout the film. The stretch roll 30 will be associated with driving means not shown which are sufficient to drive the roll at a desired speed in the range of 0.1–10.0 r.p.m., subject to the above qualifications.

The stretch roll 30 may be driven at the same number of revolutions per minute as the drum 22 or at a faster or a slower number; it may be mechanically linked to the drum 22; or it may be independently driven; or it may be controlled to be driven at a fixed or at an adjustable speed—all to the end that the proper amount of tenson, as herein defined, may be provided.

In this embodiment of the apparatus of this invention, a riding wheel, generally designated 32, may be provided. The riding wheel 32, as detailed in FIGURE 1 may include a series of smaller wheels all mounted on a common axis which is mounted on the frame which supports drums 20 and 22 and the roll 30 as shown in FIGURE 1, or is mounted in some other manner as shown more schematically in FIGURE 3; it will be positioned so that the surface of the wheel 32 will firmly and gently touch the surface of roll 30 and thereby facilitate the development of the hereinbefore noted tension in the film which in operation will pass between the stretch roll 30 and the riding wheel 32.

The riding wheel 32 will preferably be resiliently mounted to permit it to firmly and gently touch the film on stretch roll 30, and this resilient mounting may include e.g. spring loaded bearings in the embodiment of FIGURE 1.

It is a feature of this embodiment of the invention that the apparatus includes a chill flaker including a refrigerated conveyor and flaker, generally designated 28 in the drawings. Included therein in this embodiment may be an inclined screw conveyor 34 rotatably mounted within an insulated tube 36. The lower inlet end bears port 40 over which is mounted hopper 42 each of which is large enough to permit passage therethrough of the product leaving roll 30.

Figure 5:
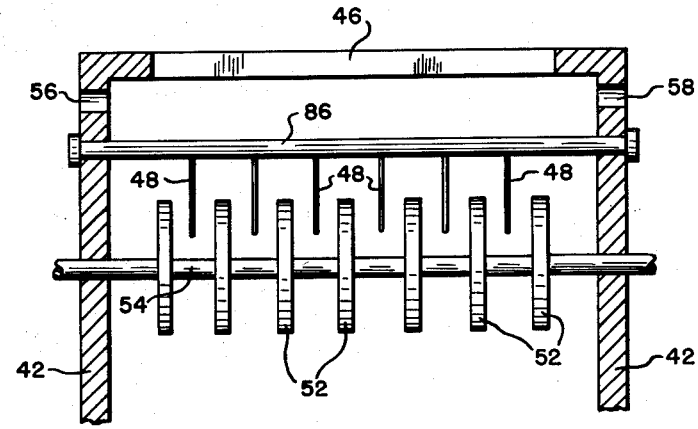
FIGURE 5 is an enlarged elevation with parts cut away of a portion of the apparatus of this invention.

FIGURE 5 shows, in schematic detail, the hopper and breaker assembly 42 as the downwardly descending sheet of material enters the hopper 42 and passes downwardly therethrough. The sheet may be cooled by air leaving the upper portion of the hopper through the elongated slot 46 at the top of the hopper and also through holes on parts 56 and 58. The sheet-breaker, positioned preferably in the upper portion of hopper 42, may include a horizontally mounted shaft 54 bearing a plurality of spaced discs 52. In the embodiment of FIGURE 5, the breaker discs 52 may be cylindrical discs mounted on rotating shaft 54. As there shown, the sheet breaker may also include a plurality of guide wires 48 descending from a horizontal shaft 86 and terminating adjacent to shaft 54. As shown, each guide wire 48 will terminate between one pair of discs 52.

Figure 6:
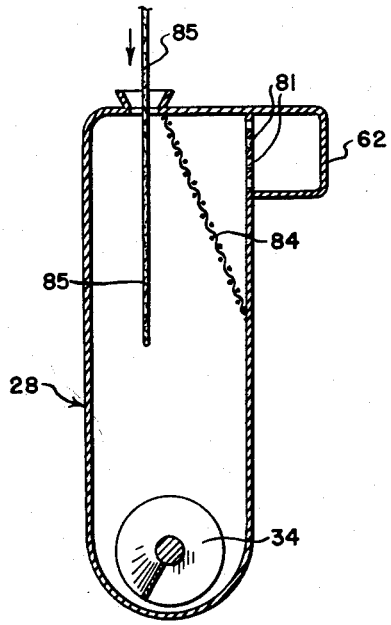
FIGURE 6 is a vertical sectional view of a modification of the apparatus of FIGURE 1.
Figure 7:
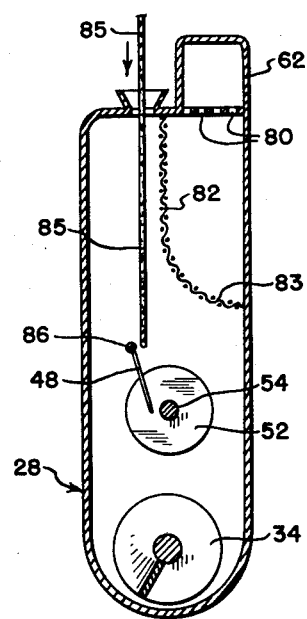
FIGURE 7 is a vertical sectional view of another modification of the apparatus of FIGURE 1.

FIGURES 6 and 7 disclose alternative embodiments of the assembly at the inlet end of conveyor-flaker 28. As shown in FIGURE 6, for example, as the downwardly descending sheet of material 85 approaches screw conveyor 34, it may be cooled by air which is leaving vessel 28. More specifically, in this embodiment of FIGURE 6, the vessel 28 includes a foraminous wall or screen 84 through which air may pass before leaving through perforations 81 and conduit 62.

In FIGURE 7, another alternative embodiment, the vessel 28 is shown with the sheet breaker including horizontally mounted shaft 54 and discs 52 in cooperative relationship with guide wires 48 which are mounted on shaft 86. As hereinbefore noted, the sheet-breaker is mounted above screw 34. In FIGURE 7, the foraminous wall may include an upper generally vertically extending portion 82 and a lower portion 83, the latter joining the former at one end and terminating at a wall of vessel 28 at its other end. In this embodiment, the conduit 62 may be at the upper extremity of vessel 28 and the perforations 80 may be in the upper or top wall of the vessel.

It will be noted that in FIGURES 5, 6, and 7, the hopper and breaker assembly 42 are integrally formed with and are a portion of the conveyor-flaker 28, i.e. the side walls 28 of the conveyor may also serve as the side walls of the hopper.

Conduit 28 bears at its upper end, the end furthest removed from the end at which hopper 42 is located, a cold air inlet conduit 60; and at the lower end an air outlet 62. The upper end of tube 36 also bears a hopper 68 which preferably contains therein a flaker for reducing the material leaving the upper end of tube 36 to desired smaller size. This flaking device may include a paddle 64 driven by a gear 66 so as to press the material through a cylindrical screen 67 from which it falls into collector 69.

Figure 2:
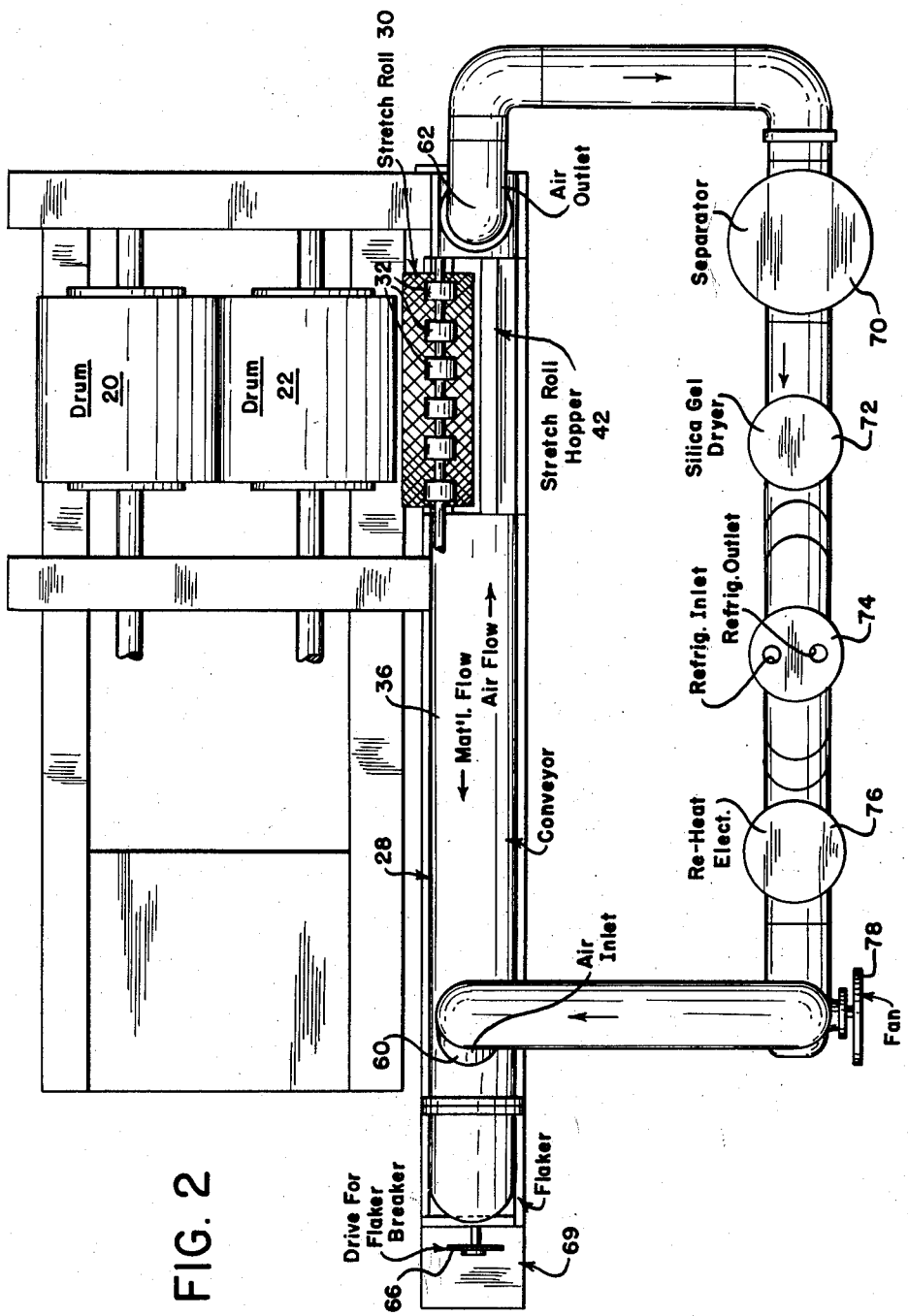
FIGURE 2 is a schematic plan view of the apparatus of FIGURE 1.

Cooling of the material in tube 28 may be effected by means of cool air cooled in a refrigeration circuit. Air may be withdrawn from air outlet 62 (shown in FIGURE 2) and then passed through an air separator preferably of the cyclone type 70, a silica gel air dryer 72, a plurality of indirect heat exchange units of the refrigerated coil type 74, an electrical heating unit 76, and a fan 78 adapted to recirculate the refrigerated dehumidified air to the air inlet 60 and thence in a counter-current path to the material passing from the drum dryer to the flaker. While silica gel is described as the adsorbent material, any one of a number of adsorbent materials are contemplated as within the scope of operation of such a dryer. The refrigeration units 74 chill the partially dehumidified air to temperatures below freezing in many instances and in so doing condense remaining moisture which has not been removed by the inorganic adsorbent materials in the dryer. Following the removal of moisture in the refrigeration unit, the substantially dehumidified air is reheated in the heater unit designated by 76 wherein by gradual heating of the volume of air the relative humidity of air is lowered. The thus dehumidified air, which is now not only dry but also hydrophilic because of its partial reheating, is recirculated by means of the blower fan 78 through the system in countercurrent contact with the particles of product.

In accordance with a specific example of a process employing the apparatus of the instant invention, a pear puree (to which had been added 3% by weight of tapioca starch) having a moisture content of 86%–88% was fed to a pool of pear puree maintained at the pinch of a double drum dryer. Clearance between the drums was 0.007–0.008 inch. The rolls 20 and 22 of the dryer were 24 inches in diameter and each had an effective heating surface (chrome plated) of about 25 square feet.

Steam was added to the interior of the drums at 20 p.s.i.g. and the drums were rotated at 0.8 r.p.m. The puree formed a film on the drum and as the hot drum rotated, the film was dehydrated to about 2.5%–5% moisture. After traversing about 225° of the drum surface, the film of material was removed from the drum by a doctor blade 24 which was positioned substantially tangentially to the surface of the drum. The removed film passed substantially horizontally over a short distance to the stretch roll. During its brief time of passage, it cooled only slightly and it was stretchable or plastic.

The doctored film was passed over a 6-inch diameter stretch roll 30 having a foraminous surface formed of expanded metal. The stretch roll was rotated at 1.33 r.p.m. and the sheet or film of pear puree was stretched as it passed thereover. A riding wheel 32 gently and firmly pressed on the film as it passed over the stretch roll 30 and insured a positive and uniform maintenance of the tension.

The product pear puree film had a sheet thickness of about 0.005–0.007 inch (unit weight 6.55 g. per square foot) and was characterized by a discontinuously ruptured surface. The so-stretched film was passed downwardly into stretch roll hopper 42 containing breaker discs 52 integrally mounted on shaft 54 which broke up the film into smaller sized pieces or coarse flakes which then passed into insulated tube 36 containing screw conveyor 34. Here the dried puree was contacted by dry air flowing downwardly through the screw conveyor as the pieces moved upwardly therethrough while progressively reducing in flake size under the influence of the screw conveyor. Temperature of air into the conveyor was 17° F. and air temperature out of the conveyor was 27° F.

The material consisting substantially of fine flakes left the screw conveyor at its upper end and passed into the flaker which included rotating paddles 64 (driven by suitable means not shown) which gently pressed the pear puree pieces through the holes in a screen to permit attainment of the entire product in the desired size.

The dehydrated pureed product obtained by use of the apparatus of the instant invention is particularly characterized by its substantially immediate—to 5 seconds rehydration on contact with liquid to give a desirable puree.

It will be apparent to those skilled-in-the-art that use of the novel apparatus of this invention, which provides a simple means for creating and maintaining a controlled tension and thereby permits controlled stretching a film almost to its point of failure, makes possible the continuous and uninterrupted production of a novel product which possesses unexpectedly superior properties.

Although the instant invention has been described with reference to certain specific examples, it will be apparent to those skilled-in-the-art that various changes and modifications may be made thereto; and that these changes and modifications will fall within the scope of this invention.

I claim:

1. Apparatus for producing a free-flowing flaked puree from a descending sheet of stretch material at an elevated temperature, which comprises flaking means located in the path of said descending sheet for breaking said sheet into discrete coarse flakes, a substantially horizontal conduit having a material inlet located so as to receive said discrete flakes from said flaking means and a material outlet spaced from said material inlet, means within said conduit for conveying said flakes from said inlet to said outlet and for simultaneously effecting a reduction in the size of said flakes, means for passing a stream of conditioned gas in a predetermined path through said conduit and into communication with said descending sheet so that said gas stream contacts and conditions said flakes for such size reduction as they travel through said conduit and then cools said sheet before the flaking thereof by said flaking means, and means at said outlet for collecting said conditioned and reduced flakes.

2. Apparatus as claimed in claim 1 and including a closed recirculatory conditioning system for receiving and conditioning gas from the gas exit portion of said conduit after it has cooled said sheet and for reintroducing said conditioned gas into the gas entrance portion of said conduit.

3. Apparatus as claimed in claim 2 wherein said closed recirculatory conditioning system includes means for drying said gas and means for causing positive movement of said gas through said system.

4. Apparatus as claimed in claim 1 wherein said conveying means includes a rotatable screw within said conduit extending between said inlet and said outlet and occupying less than a complete cross-sectional area thereof, said screw serving to agitate said flakes and to further reduce the size thereof as it moves said flakes from said inlet to said outlet, and wherein said conditioned gas is refrigerated and dried and is passed through said conduit in a direction countercurrent to the direction of travel of said flakes therethrough.

5. Apparatus as claimed in claim 1 wherein said descending sheet passes into a housing having a sheet entrance opening located above said flaking means and an opening communicating with said conduit below said flaking means, said housing having a foraminous wall adjacent said entrance opening, said conditioned gas passing from said conduit to said housing and then out of said housing through said foraminous wall so as to contact said descending sheet and reduce the temperature thereof prior to its being engaged by said flaking means.

6. Apparatus for producing a free-flowing flaked puree from a descending sheet of material at an elevated temperature, which comprises flaking means located in the path of said descending sheet for breaking said sheet into discrete coarse flakes, a substantially horizontal conduit having a material inlet located so as to receive said discrete flakes from said flaking means and a material outlet spaced from said material inlet, means within said conduit for conveying said flakes from said inlet to said outlet and for simultaneously effecting a reduction in the size of said flakes, means for passing conditioned gas through said conduit so that said gas contacts and conditions said flakes for such size reduction as they travel through said conduit, a foraminous surface spaced from said outlet and positioned so as to receive flakes passing through said outlet, a plurality of moving paddles which move across said foraminous surface and gently press said flakes through said surface to further reduce the size thereof, and means located below said foraminous surface for receiving the flakes passing therethrough.

7. Apparatus as claimed in claim 5 wherein said flaking means includes a plurality of axially spaced breaker members mounted on a substantially horizontal rotatable axis and a plurality of horizontally spaced, vertically disposed fixed guide wires, each of said guide wires depending between a pair of breaker members and being located so that said descending sheet is engaged by said guide wires and located in predetermined position relative to the path of travel of said breaker members.

8. Apparatus for producing a free-flowing flaked puree from a descending sheet of material at an elevated temperature, which comprises a housing having an opening through which said descending sheet passes and a foraminous wall adjacent said sheet entrance opening; a plurality of axially spaced breaker members within said housing and mounted on a substantially horizontal rotatable axis; a plurality of horizontally spaced vertically disposed fixed guide wires, each of said guide wires depending between a pair of breaker members and being located so that said descending sheet is engaged by said guide wires and positioned in predetermined relation to said sheet thereby ensuring breaking of the sheet into discrete coarse flakes by said breaker members; a substantially horizontal conduit having a material inlet communicating with an opening in the bottom of said housing so that said discrete flakes formed by said breaker members fall into said conduit, said conduit having a material outlet spaced from said material inlet; a rotatable screw within said conduit extending between said inlet and said outlet and occupying less than the complete cross-sectional area thereof, said screw serving to agitate said flakes and to further reduce the size thereof as it transports them from said inlet to said outlet; a closed recirculatory gas moving system which includes means for moving dried and refrigerated gas under pressure into said conduit at a point adjacent the outlet thereof, through said conduit countercurrent to the movement of said flakes to condition same for size reduction, through said housing to contact and reduce the temperature of the sheet before it is broken, through said foraminous wall and into gas drying and refrigerating means to be reconditioned and then recirculated; a foraminous curved surface spaced from said material outlet and positioned to receive the flakes passing through said material outlet; a plurality of moving paddles mounted on a rotatable axis for rotation therewith and positioned to move in a curved path across said curved foraminous surface and gently press said flakes through said surface to further reduce the size thereof; and a hopper located below said foraminous surface for receiving the flakes passing therethrough.

References Cited by the Examiner

UNITED STATES PATENTS

| 1,307,508 | 6/19 | Booth. | |
| 2,089,978 | 8/37 | McNatt | 34—70 X |
| 2,180,968 | 11/39 | Schorn et al. | |
| 2,186,282 | 1/40 | Cowgill | 34—62 |
| 2,225,781 | 12/40 | Hinerfeld | 241—73 |
| 2,363,037 | 11/44 | Arnold | 34—182 X |
| 2,665,851 | 1/54 | Strehlow | 241—73 |
| 2,706,088 | 4/55 | Paul | 241—190 X |
| 2,797,052 | 6/57 | Clark | 241—190 |
| 3,082,541 | 3/63 | Moore et al. | 34—62 |

J. SPENCER OVERHOLSER, *Primary Examiner.*

CHARLES E. O'CONNELL, ROBERT A. O'LEARY, *Examiners.*